July 30, 1963 G. HOHWART ETAL 3,099,457
CHUCK
Filed June 2, 1960 6 Sheets-Sheet 1

INVENTORS.
George Hohwart
Paul Toth.
BY
Harness, Dickey & Pierce
ATTORNEYS.

INVENTORS.
George Hohwart
Paul Toth
BY
Harness, Dickey & Pierce.
ATTORNEYS.

July 30, 1963 G. HOHWART ETAL 3,099,457
CHUCK
Filed June 2, 1960 6 Sheets-Sheet 5

Fig. 10.

INVENTORS
George Hohwart
Paul Toth.
BY
Harness, Dickey & Pierce
ATTORNEYS

3,099,457
CHUCK
George Hohwart, Farmington Township, Oakland County, and Paul Toth, Allen Park, Mich., assignors to N. A. Woodworth Company, Ferndale, Mich., a corporation of Michigan
Filed June 2, 1960, Ser. No. 33,542
11 Claims. (Cl. 279—106)

This invention relates generally to chucks and more particularly to an improved power chuck in which the workpiece engaging jaws are mounted on rocker arms.

One disadvantage of many power chucks now in use is that the jaws are mounted in exposed slides or the like which come in contact with dirt, coolant, chips and the like that cause premature wear of the moving parts of the chuck. In addition, this foreign material causes excessive frictional forces on the jaws resulting in loss of power. Another disadvantage is their tendency to move a workpiece away from an end stop, as a result of the play in the jaws relative to their support. Such movement may be slight but it is significant because it affects the accuracy of the work performed in the chuck, as well as the torque transmitted to the workpiece. It is an object of this invention, therefore, to provide an improved power chuck in which the workpiece engaging jaws are mounted on rocker arms that are pivoted on lubricated ball joints; the actuating mechanism for moving the rocker arms is completely enclosed and lubricated; the jaws are moved in a path which includes a component in the direction of the end stops for positively moving the workpiece against the end stops which thus function to impart additional driving force to the workpiece; and a lever mechanism is utilized which provides for an efficient transfer of power to the jaws for effecting clamping of the workpiece against the end stops.

Further objects, features and advantages of this invention will become apparent from a consideration of the following description, the appended claims and the accompanying drawing in which:

Figure 1:
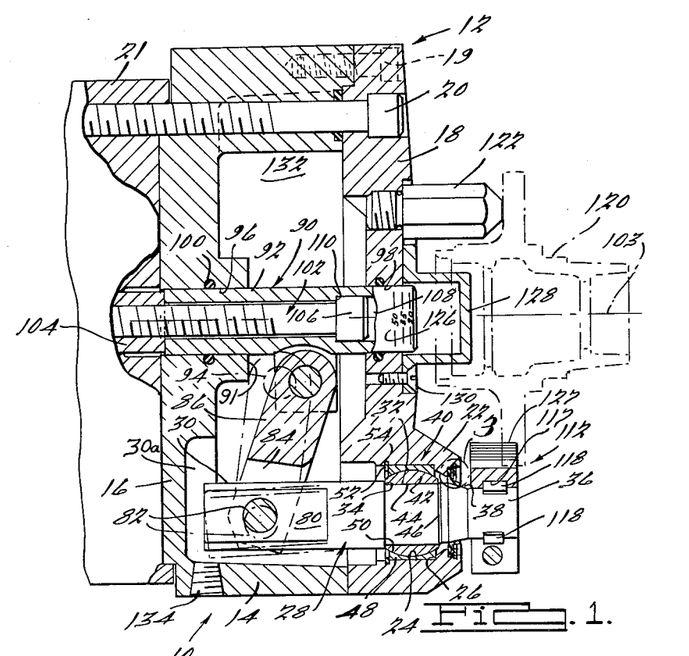
FIGURE 1 is a sectional view of one form of the chuck of this invention, looking substantially along the line 1—1 in FIG. 2.
Figure 2:
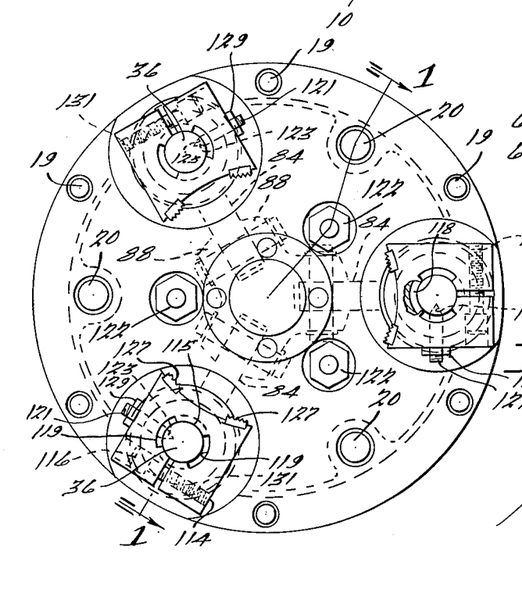
FIGURE 2 is a front elevational view of the chuck shown in FIG. 1.

With reference to the drawing, the chuck of this invention, indicated generally at 10, is illustrated in FIG. 1 as including a housing 12 which consists of a hollow body 14 which is closed at its rear side by a wall 16 and is provided at its front side with a removable cover plate 18 secured to the body 14 by means of a plurality of bolts 19. Bolts 20 are utilized for mounting the chuck 10 on a machine having a spindle 21. The cover plate 18 is formed with a plurality of bosses 22 each of which is provided with a through opening 24 provided with an internal shoulder 26. It is to be understood that while three openings 24 are shown in the illustrated form of the chuck 10, more or less openings 24 may be provided if desired. An elongated rocker arm 28, which may be either straight or have angularly related portions, extends through each of the openings 24. The rocker arm 28 has a cylindrical inner end portion 30, positioned within the housing 12, an intermediate reduced portion 32 which is separated from the portion 30 by a radial shoulder 34, a further reduced outer end portion 36 positioned outside the housing 12, and a tapered connecting portion 38 extending between the portions 32 and 36.

A ball and socket joint 40 is provided for each arm 28 and mounted on the intermediate rocker arm portion 32 at a position within the opening 24 for pivotally mounting each of the rocker arms 28 on the cover plate 18. The joint 40 consists of a spherical ball member 42 having an axial bore 44 which is positioned on the intermediate rocker arm portion 32 at a position in which one end of the ball 42 abuts the shoulder 34. If desired, the ball member 42 may be formed as an integral part of the rocker arm 28. A retainer ring 46 extends about the rocker arm 28 and maintains the ball 42 against the shoulder 34.

The ball 42 is rotatably supported within a socket member 48 which has a spherical opening 50 and is moved into the opening 24 to a position against the shoulder 26. A retainer ring 52 is positioned in a slot 54 in the cover plate 18 for retaining the socket member 48 against the shoulder 26.

Figure 3:
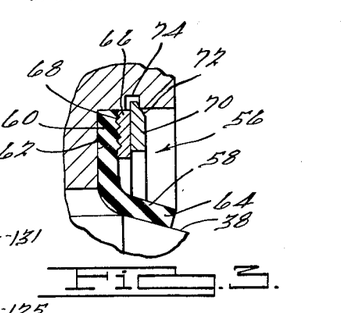
FIGURE 3 is an enlarged detail view of the portion of the chuck shown in FIG. 1 enclosed within the circle indicated by the numeral "3"

A seal assembly 56 (FIG. 3) is mounted on the cover plate 18 at the outer end of each of the openings 24 for engaging the rocker arm 28 to seal the joint 40 against the entry of dirt, chips, and other foreign particles which might cause wear of the joint 40. The seal assembly 56 consists of a resilient seal member 58 formed of rubber or the like which is of an annular shape and has its outer edge portion 60 positioned against a shoulder 62 on the cover plate 18 which surrounds the opening 24 at the outer end thereof. The inner edge portion 64 of the seal member 60 is of a smaller diameter than the adjacent portion 38 of the rocker arm 28 so that the inherent resiliency of seal member 58 maintains it in sealing engagement with the rocker arm portion 38. A clamp ring 66 has teeth 68 on one face thereof which engage the outer edge portion 60 of the sealing member 58 so as to clamp the member 58 between the shoulder 62 and the ring 66. A retainer ring 70 of expandable type has an inclined outer edge surface 72 which is forced by the tendency of the ring 70 to expand against one edge of an internal groove 74 in the cover plate 18 so that the retainer ring 70 is urged by the edge of groove 70 against the clamping ring 76 to maintain it in tight engagement with the seal member 58. This holds the seal member 58 in a position in which it will be in sealing engagement with the rocker arm portion 38 at all points around the periphery thereof during pivoting of rocker arm 28.

The inner end portion 30 of each rocker arm 28 is provided on opposite sides with flat end portions 80, only one of which is shown, and a pivot pin 82 extends through the portions 80 for connecting a toggle lever 86 thereto. The flat sides 80 facilitate radial guiding of the inner end 30 of each arm 28 in a guide cavity 30a in the housing rear wall 16. The bifurcated end portion 84 of each toggle lever 86 is mounted on the pin 82 so that it straddles the flat end portions 80. The opposite end of each toggle lever 86 is positioned between a pair of closely spaced fingers 88 on a spider member 90 which has an elongated tubular hub 92 on which the pairs of fingers 88 are formed. A pivot pin 94 extends through an adjacent pair of fingers 88 and one end of a toggle lever 86 positioned therebetween for attaching the toggle lever 86 to the spider 90.

The hub 92 of the spider 90 is slidably mounted in axially aligned openings 96 and 98 in the housing wall 16 and the cover plate 18 and seals, of O-ring type 100, are mounted in the openings 96 and 98 so that they engage the hub 92 to prevent travel of lubricant out of housing 12. A drawbar 104, which is a part of the machine on which the spindle 21 is mounted, engages the left end, as viewed in FIG. 1, of the hub 92 and is secured to the hub 92 by a bolt 102 which extends axially through the hub 92. The bolt 102 has an enlarged head 106 which is positioned within a cavity 108 in the outer end of the hub 92 so that it engages a shoulder 110 formed at the inner end of the cavity 108. The drawbar 104 is connected to any suitable power means (not shown) on the machine on which it is mounted which is operable to apply a pulling force of the necessary magnitude to the drawbar 104 and to return the drawbar 104 in the opposite direction.

In the use of the chuck 10, jaws 112 of desired size are mounted on the outer ends 36 of the rocker arms 28, the size of the jaws 112 being used depending on the size of the workpiece to be gripped in the chuck 10. Each jaw 112 includes a body 114 provided with a longitudinal bore 115 in which an annular peripheral inner groove 117 is formed intermediate the ends of the body 114. The outer end portion 36 of each rocker arm 28 is formed with a pair of diametrically opposite peripheral keys or lugs 118 of a size to pass longitudinally through a pair of longitudinal grooves 119 formed in the bore 115 during sliding movement of the body 114 onto the rocker arm portion 36. The body 114 is then rotated to position the keys 118 in the annular groove 117 between the grooves 119. A set screw 121 having a conical tip 123 extends through the body 114 so that the tip 123 projects into a conical cavity 125 in the rocker arm 28. The amount of floating movement of the body 114 relative to the rocker arm 28 so that the jaw will adapt itself to the surface of the workpiece as it grips the workpiece is determined by adjusting set screw 121. A lock nut 129 holds the set screw 121 in an adjusted position. A clamp screw 116 is tightened to hold the body 114 on the rocker arm 28 so as to prevent tipping movement of the body 114 about an axis extending transversely of the arm 28. The screw 116 for each body 114 can be adjusted to either hold the body 114 in a fixed position on its arm 28 or permit some rotation of the body 114 on the arm within limits determined by the position of the set screw 121. A set screw 131 is provided for each screw 116 to hold it in an adjusted position.

Figure 4:
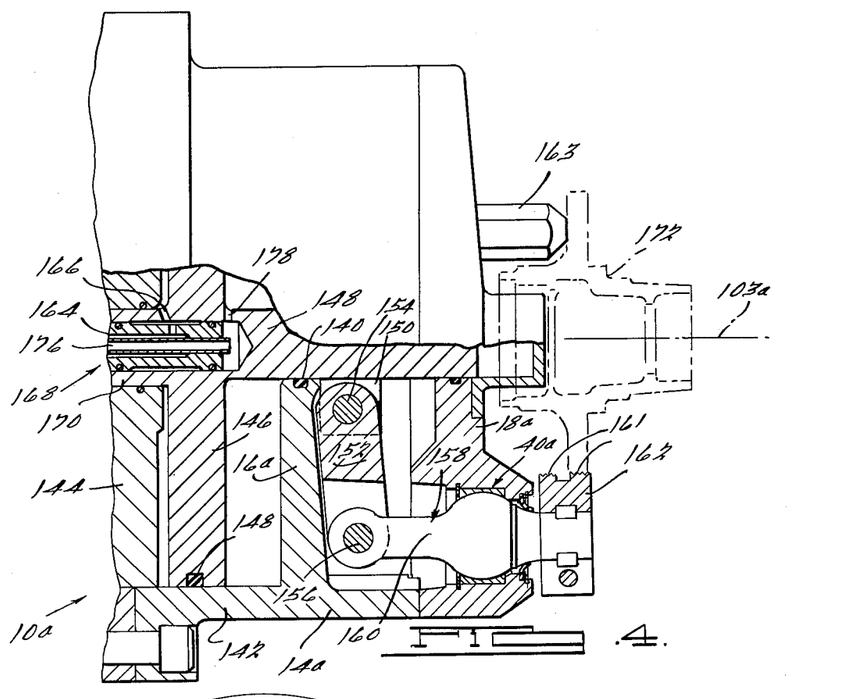
FIGURE 4 is a side elevational view of another form of the chuck of this invention, with some parts broken away and other parts shown in section for the purpose of clarity.

Serrated jaw elements 127 are mounted on the radially inner side of the body 114 for engagement with the workpiece, which is indicated in broken lines at 120 in FIG. 1. As shown in FIG. 1, the elements 127 are sufficiently wide such that only a portion of each element 127 grips the workpiece 120. When these portions of the elements 127 become worn the body 114 can readily be removed from the arm 28, by loosening the bolt 116 and backing off the set screw 121, and turned around and re-mounted on the arm 28 so that the un-worn portions of the elements 127 are engageable with the workpiece. The mounting of each jaw 112 permits easy removal and re-mounting. If desired, each body 114 may be provided with two sets of longitudinally spaced jaw elements, as shown in FIG. 4, for engagement with rough and finished parts of a workpiece when the workpiece is reversed on the chuck 10 following reversal of each jaw 112. End stops 122, illustrated as being three in number, are mounted on the cover plate 18 for engagement with the workpiece 120 to stabilize the workpiece in its gripped position on the cover plate 18.

In the initial setup of the chuck 10 for a particular workpiece 120, the stroke of the power means (not shown) for operating the draw bar 104 is initially adjusted to give the desired amount of jaw movement on the diameter of the workpiece and to adjust the power ratio of the chuck, namely, the ratio of the force applied to the toggle levers to the force applied by the jaws 112 to the workpiece 120. In other words, the further forward (toward the right in FIG. 1) the spider 90 is moved, prior to application of the pulling force thereto, the wider the opening encompassed by the jaws 112 and the smaller the angle of the toggle levers 86 relative to the rocker arms 28. Consequently, when the spider 90 is moved rearwardly by the application of draw bar pull thereto, the lower the power ratio. The extent of jaw opening and the power ratio is readily checked by referring to a scale 126 on the outer end of the spider hub 92. This scale can be compared to a chart (not shown) which for any scale reading will indicate the power ratio and the amount of jaw movement on the diameter. A guard member 128, of cap-shape, is removably secured by screws 130 to the cover plate 18 so as to enclose the outer end of the hub 92 and protect it against accidental damage and encumbrance with foreign particles. As a practical matter, the stroke of the drawbar 104 is seldom adjusted since the drawbar 104 is a part of a machine on which the chuck 10 is mounted. Usually the jaws 112 are bored to adapt them to a particular workpiece so that approximately one-half the illustrated toggle lever movement is effective to move the jaws 112 to workpiece clamping positions.

With the chuck 10 in the position illustrated in solid lines in FIG. 1, assume that the jaw elements 127 are slightly spaced from the workpiece 120 when it is held in a centered position with respect to the jaws 112. When a pulling force is applied to the drawbar 104, the spider hub 92 is moved toward the left as viewed in FIG. 1 so as to move the pin 94 to the broken line position and thereby move the pin 82 radially outwardly relative to the chuck axis 103 to the broken line position shown therein to rock each rocker arm 28 about the ball and socket joint 40 therefor so as to move the jaw 112 into tight engagement with the workpiece 120. A hub portion 93 of the housing back wall 16 is engageable with the toggle levers 86, as shown in FIG. 1, to prevent the toggle levers from being moved to positions in which the force buildup therein transferred to the rocker arms 28 is so high as to cause possible damage to the rocker arms.

Each rocker arm 28, during its movement, passes through a position in which the portion 36 thereof is parallel to the chuck axis 103. Consequently, during the final portion of the rocking movement of each rocker arm 28, the jaw 112 thereon follows a curved path which has a component in a direction toward the cover plate 18 and parallel to the axis 103. As a result, the workpiece 120 is gripped by the jaws 112 and moved rearwardly toward the cover plate 18 into tight engagement with the end stops 122 to thereby stabilize the support of the workpiece 120 on the chuck 10. The engagement of the end stops 122 with the workpiece 120 has the additional advantage that the end stops 122 can also impart rotational forces from the chuck to the workpiece.

The workpiece 120 is readily released by moving the hub 92 in a reverse direction toward the workpiece to in turn move the toggle levers in directions to actuate the rocker arms 28 so that they are swung in a direction to move the jaws 112 away from the workpiece. Each jaw 112 is shown mounted on a single rocker arm 28 but it is to be understood that a pair of rocker arms 28 may be utilized when necessary for structural purposes.

The chamber 132 formed in the body 14 and closed by the cover plate 18 is partially filled with a lubricant such as oil and a drain plug 134 is provided in one side of the body 14 for removing and replacing lubricant. During operation of the chuck 10, when it is rotated or turned quickly, this lubricant is moved by centrifugal forces into engagement with the ball joints 40 so as to maintain them in a lubricated condition, and the seals 58 prevent leakage of fluid.

The forms of the chuck of this invention hereinafter described, and designated generally 10a, 10b, 10c, 10d, 10e, and 10f, are in general modifications of the chuck 10 described in detail above. Consequently, only the portions of these modified chucks which distinguish them from the chuck 10 are described in detail hereinafter and like numerals, sometimes with letter suffixes, are used to indicate like parts on the chuck 10 and the modified forms of the chuck.

Figure 5:
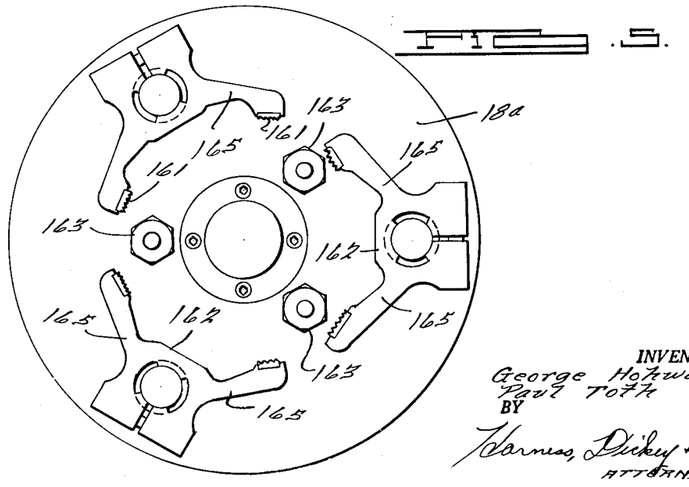
FIGURE 5 is a front elevational view of the chuck shown in FIG. 4.

In the modified chuck 10a illustrated in FIGS. 4 and 5, the body 14a is provided with an axial opening 140 in its rear wall 16a and is provided with a rearward tubular extension 142 which constitutes a cylinder closed at its rear end by a wall 144. A piston 146 provided with a sealing ring 148 is mounted for reciprocation in the cylinder 142 and is provided with an axial extension 148 on one side which constitutes the hub of a spider having radially extending pairs of fingers 150 (only one of which is shown) corresponding to the fingers 88 in chuck 10. The fingers 150 are connected to the inner ends of a plurality of toggle levers 152, only one of which is shown, by pins 154. The opposite end of each toggle lever 152 is bifurcated and is connected by a pin 156 to the inner end of a rocker arm 158 which has an intermediate section 160 which is of a reduced size in cross section sufficient to permit some flexing or bending without any permanent deformation of the rocker arm 158. A ball joint 40a, similar to the ball joints 40, is provided for pivotally mounting each of the rocker arms 158 in the cover plate 18a and the outer end of each of the rocker arms 158 is connected to a jaw 162, having longitudinally spaced sets of jaw elements 161, mounted in a manner similar to the mounting of the jaw 112. Each element 161 is mounted on the outer end of an elongated reduced section 165 of the jaw 162 which can flex relative to the main body of the jaw 162.

The piston 146 has an axial stem 170 formed with a cavity in which a passage block 168 is sealably mounted. The block 168 has an annular passage 164 formed therein which communicates through a passage 166 in the stem 170 with the cylinder 142 on one side of the piston 146. An axial passage 176 in the block 168 communicates through a passage 178 in the hub 148 with the cylinder 142 on the opposite side of piston 146.

In the operation of the chuck 10a, when air is supplied to the cylinder 142 through the annular passage 164, the piston 146 is moved toward the right as viewed in FIG. 4 to move the jaws 162 away from the workpiece 172 and the chuck axis 103a. When air is supplied to the cylinder 142 through the axial passage 176, the piston 146 is moved in the opposite direction so that the toggle levers 152 are moved toward postions perpendicular to the hub 148 so as to pivot the rocker arms 158 in a direction to move the jaws 162 toward the axis 103a into clamping engagement with the workpiece 172. The outer portion of each arm 158 moves through a position parallel to the axis 103 during clamping of the workpiece so that on final movement of the rocker arm the jaw 162 thereon is also moved toward the cover plate 18a so that the workpiece 172 is moved against the end stops 163. The flexing action of either or both the jaw sections 165 and/or the rocker arms 158 permits the toggle levers 152 to be moved to slightly over-center positions, as illustrated for the toggle lever 152 in FIG. 4, so that the chuck is self-locking. In other words, the desired self-locking action can be obtained in the chuck 10a by providing a flexing section in either the rocker arms 160 or the jaws 162.

Figure 6:
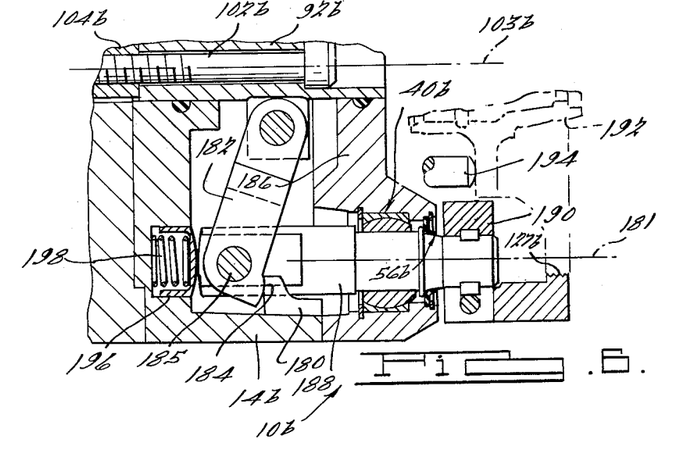
FIGURE 6 is a fragmentary sectional view of another form of the chuck of this invention.

In the modified form of the chuck 10b illustrated in FIG. 6, the inner surface of the body 14b is formed with stationary projections 180 and each of the toggle levers 182 is formed with a cam face 184 which engages one of the projections 180. A rocker arm 188 is provided for each toggle lever 182 and is pivotally mounted on the cover plate 18b for the body 14b by means of a ball joint 40b, like the ball joint 40, provided with a seal 56b. A jaw 190, like the jaw 112 and having jaw elements 127b, is mounted on the outer end of each arm 188, so that each element 127 is located radially outwardly of the axis 181 of the joint 40b therefor, relative to the chuck axis 103b. This particular jaw configuration is required to adapt the chuck 10b to a particular diameter workpiece 192.

The cam face 184 acts as a moving fulcrum for its toggle lever 182 during movement of the drawbar 104b to the left in FIG. 6 to move the spider hub 92b to the left to in turn move the pin 185, which connects the toggle lever 182 to the rocker arm 188, downwardly. Consequently, by forming the cam face 184 so that it is on an increasing radius, relative to pin 185, in a direction toward the terminal end of the lever 182, an inward movement of rocker arm 188, namely, movement toward the left as viewed in FIG. 6, during pivoting movement to move the jaw 190 toward the workpiece 192 is insured. This inward movement of the rocker arms 188 compensates for the tendency of the jaws 190 to move outwardly because of their location relative to the axes 181 to provide the desired inward movement of the workpiece 192 against the end stops 194. Thus, during rocking movement of each rocker arm 188 in a direction to move the jaw 190 therefor toward the workpiece 192, the rocker arm 188 is also moved in a direction inwardly of the body 14b so as to move the workpiece 192 toward the end stops 194 to insure a positive engagement of the workpiece with the end stops 194. A pusher member 196 is urged by a spring 198 into engagement with the inner end of each of the rocker arms 188 for returning it to its outer position after the load exerted on the rocker arm by the toggle lever 182 therefor has been released.

Figure 7:
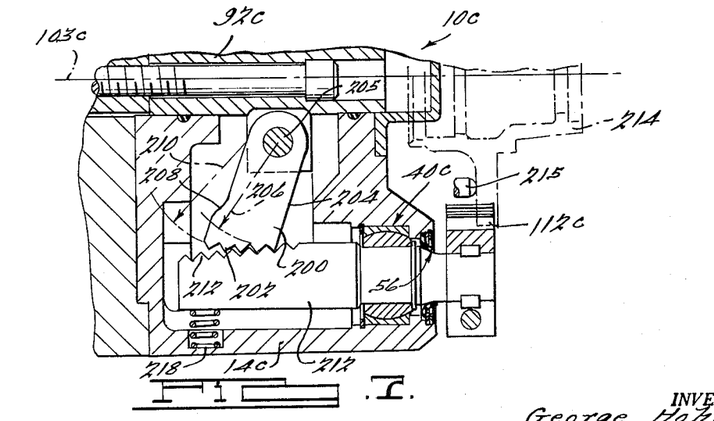
FIGURE 7 is a fragmentary sectional view of still another form of the chuck of this invention.

In the form of the chuck indicated at 10c in FIG. 7, a modified toggle action is obtained by utilizing toggle levers 200, only one of which is illustrated, which have their outer ends provided with teeth 202, formed on a variable radius relative to the toggle mounting pin 205. In the illustrated toggle lever 200, the tooth 202 adjacent the edge 204 of the arm 200 is on a radius 206 and the remaining teeth proceeding in a direction toward the tooth adjacent the edge 208 which is on a radius 210, are on a progressively increasing radius. The rocker arms 212 in the chuck 10c correspond in number to the toggle levers 200 and each rocker arm 212 is provided on one surface with a row of teeth 212 which mesh with the teeth 202. When the spindle hub 92c in the chuck 10c is moved to the left as viewed in FIG. 7, each toggle lever 200 is rocked toward its corresponding rocker arm 212 so as to in turn rock the rocker arm about the ball joint 40c therefor so as to move the jaw 112c on the rocker arm toward the workpiece 214. When the toggle levers are moved in an opposite direction, by movement of the hub 92c toward the right as viewed in FIG. 7, a spring 218 which extends between the body 14c and the inner end of the rocker arm 212 pivots the rocker arm 212 in a direction to move the jaw 112c away from the workpiece 214.

The size and position of the teeth 202 and 212 can be varied to provide the desired movement of the jaws 112c inwardly toward the chuck axis 103c and the end stops 215. By varying the position of the teeth 202 on the meshing teeth 212, the power ratio and the movement of the jaws 112c on the diameter of the workpiece 214 can be varied. Each arm 212 is mounted and shaped so that during the final portion of the clamping movement of the jaw 112c thereon, the jaw is also moved inwardly to move the workpiece 214 axially against the end stops 215.

Figure 8:
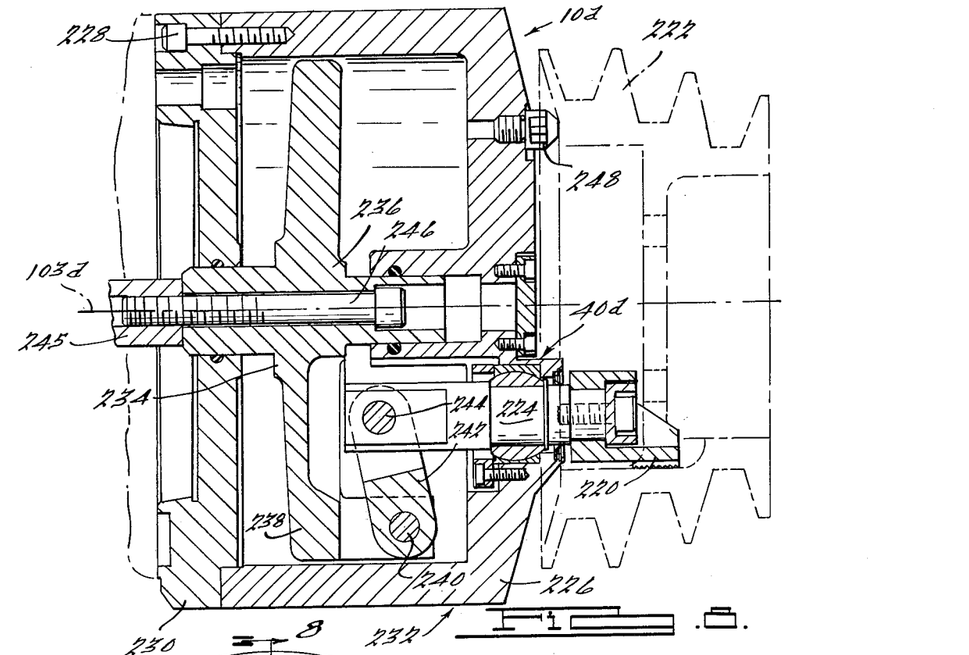
FIGURE 8 is a sectional view, looking substantially along the line 8—8 in FIG. 9 of yet another form of the chuck of this invention.
Figure 9:
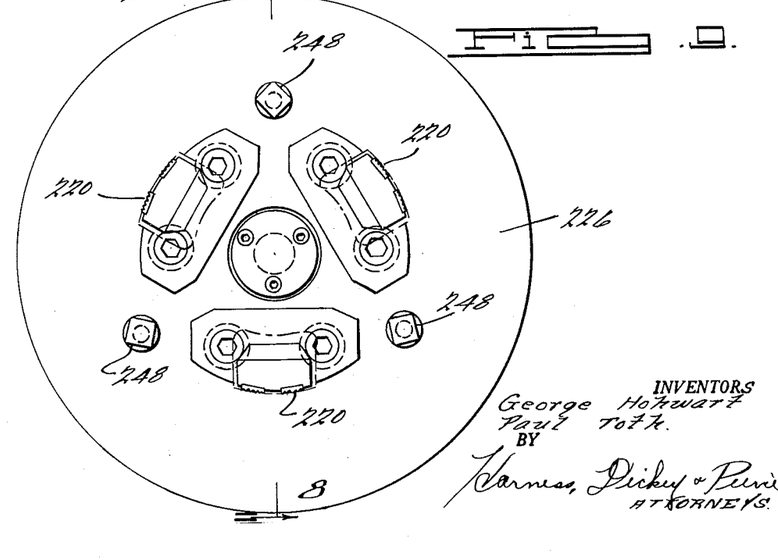
FIGURE 9 is a front elevational view of the chuck shown in FIG. 8.

The form of the chuck indicated at 10d in FIG. 8 is a modification of the external chuck 10 to obtain an internal chuck. The chuck 10d has a plurality of jaws 220, only one of which is shown, which are moved radially outwardly of the chuck axis 103d to engage the inner surface of a tubular workpiece 222. Each jaw is mounted on the outer end of a rocker arm 224 which is pivoted intermediate its ends on a ball joint 40d, like the joint 40, carried by a hollow cover plate 226 secured by a plurality of bolts 228, only one of which is shown, to a body 230 which is in the form of an annular plate. A spider 234 is mounted in the hollow housing 232 and has a hub 236 which carries L-shape arms 238 each of which is connected at its outer end by a pin 240 to the outer end of a toggle lever 242 secured at its inner end by a pin 244 to the inner end of a rocker arm 224. The hub 236 is connected, as in the chuck 10, by means of a bolt 246 to a drawbar 245 which is in turn connected to any suitable power means for moving the hub 234 in a direction to move the toggle levers 242 so as to rock the rocker arms 224 about their ball joints 40d and move the jaws 220 radially outwardly into engagement with the workpiece 222. The jaws 220 are swung in a circular path which has a component in a direction toward the cover plate 226 so that the jaws 220 not only move outwardly to grip the workpiece 222, but move the workpiece inwardly toward the cover plate 226 into engagement with a plurality of end stops 248 mounted thereon.

Figure 10:
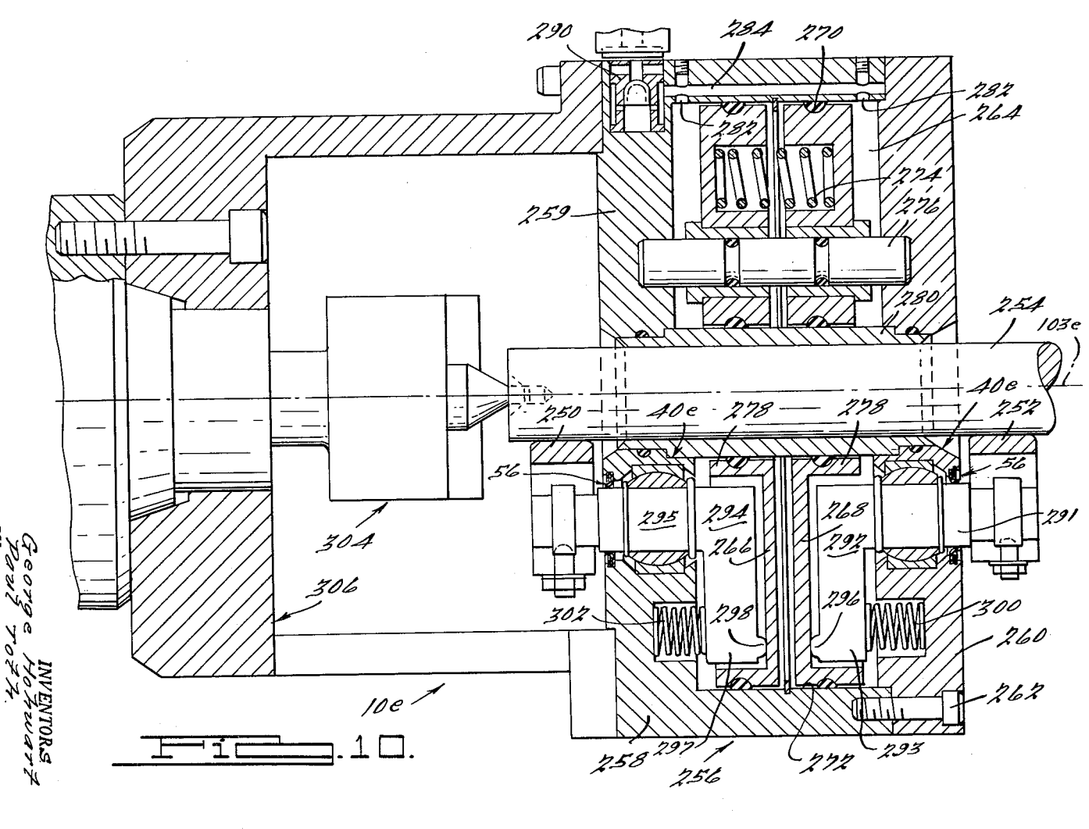
FIGURE 10 is a sectional view of still another form of the chuck of this invention.

In the form of the chuck indicated at 10e in FIG. 10, two sets of radially movable jaws 250 and 252, only one in each set being shown, are moved into gripping engagement with a workpiece in the form of a shaft 254. The jaws 250 and 252 are mounted on a hollow housing 256 which consists of a body 258 provided with a cover plate 260 secured thereto by bolts 262. The body 258 and the cover plate 260 cooperate to enclose a chamber 264 in which a pair of irregularly shaped opposed pistons 266 and 268 are mounted. Each of the pistons carries an annular sealing ring 270 which engages the inner wall 272 of the housing so as to provide a seal between the housing and each of the pistons. The pistons 266 and 268 are urged apart by a plurality of relatively heavy springs 274, only one of which is shown, positioned therebetween.

During movement of the pistons 266 and 268 toward and away from each other, they are guided on a plurality of guide pins 276 which are mounted on and extend between the cover plate 260 and the back wall 259 of the body 258. The pistons 266 and 268 are also provided with coaxial annular inner flanges 278 that are guidably supported on a tubular member 280, which is likewise mounted in and extends between the cover plate 260 and the body back wall 259, and functions as an initial support for the shaft 254. The pistons 266 and 268 are movable toward each other in response to a flow of fluid, such as air, into the chamber 264 through inlet ports 282 in the housing 258 disposed on opposite sides of the pistons. The ports 282 communicate with an inlet line 284 which may be supplied with fluid from slip ring 290 of the type shown in Patent No. 2,577,656.

A plurality of L-shape rocker arms 292 are mounted on ball joints 40e, like the joints 40, carried by the cover plate 260 and are connected at their outer ends to the jaws 252. Each rocker arm 292 has one leg 291 arranged generally parallel to the chuck axis 103e and a leg 293 at right angles to the leg 291. Similar rocker arms 294, only one of which is shown, are mounted on ball joints 40e carried by the rear wall 259 and connected at their outer ends to the jaws 250. Each rocker arm 294 has one leg 295 arranged generally parallel to the chuck axis 103e and a leg 297 at right angles to the leg 295. The inner end of each rocker arm 292 is provided with a lateral projection 296 which engages the piston 268. Each rocker arm 294 is provided with a similar projection 298 which engages the piston 266. A spring 300 extends between the cover plate 260 and each of the rocker arms 292 for normally urging the rocker arm in a direction to move the jaws 252 thereon away from the workpiece 254. Similar springs 302 are provided for urging the rocker arms 294 in a direction to move the jaws 250 away from the workpiece 254.

In the use of the chuck 10e when fluid is supplied to the chamber 264 through the ports 282 so as to move the pistons 266 and 268 toward each other, the rocker arms 292 and 294 are pivoted with respect to their ball joints 40e by the springs 300 and 302 so as to move the jaws 250 and 252 out of engagement with the workpiece 254 and release the workpiece. When the workpiece 254 is to be engaged by the jaws 250 and 252 the pressure of the fluid in the chamber 264 is relieved, by venting the ports 282 or connecting them to tank, so that the springs 274 move the pistons 266 and 268 away from each other so that they pivot the rocker arms 292 and 294 so as to move the jaws 250 and 252 against the workpiece 254. A boring head 304 is shown mounted on a machine 306 for engagement with one end of the workpiece 254, and it is to be understood that a similar head 304 may be associated with the opposite end of the shaft 254.

Figures 11, 12:
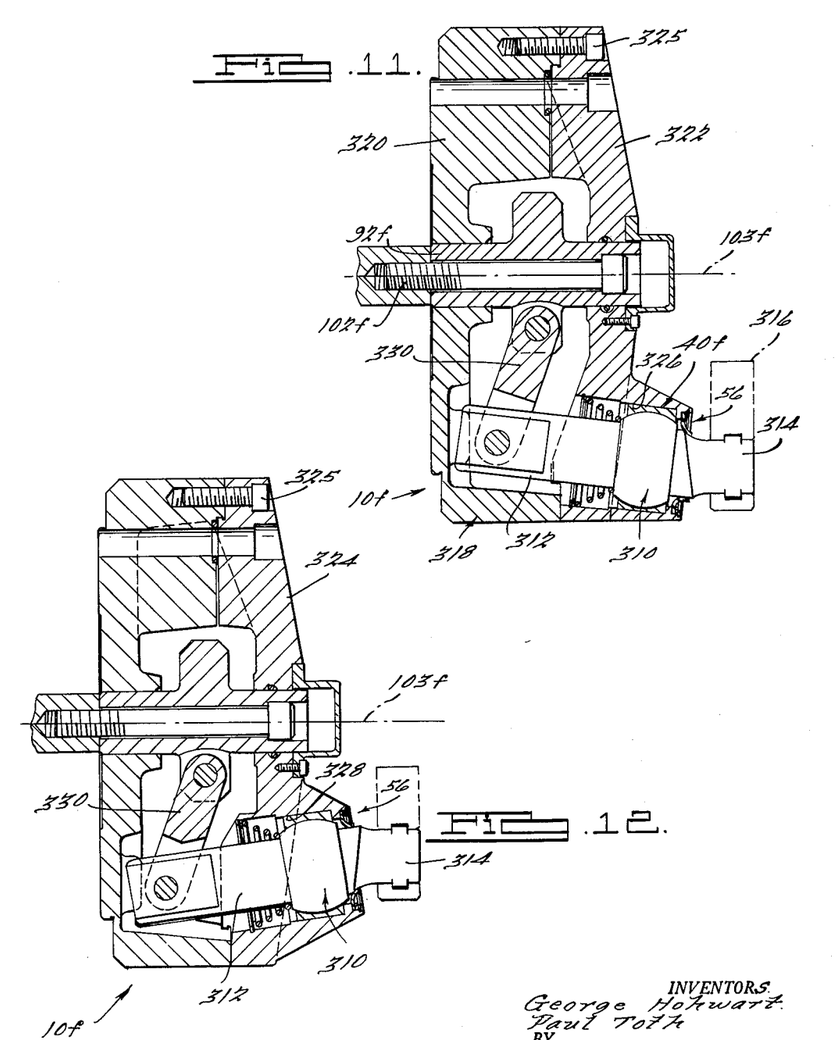
FIGURES 11 and 12 illustrate another form of the chuck of this invention in which a pair of cover plates may be interchanged to adjust the capacity of the chuck for different size workpieces.

In the chuck 10f illustrated in FIGS. 11 and 12, each of the rocker arms 310 is mounted in a ball joint 40f and has its inner end portion 312 extended angularly with respect to its outer end portion 314 which carries a jaw 316. The chuck 10f includes a housing 318 which consists of a hollow body 320 which is adapted to have different cover plates indicated at 322 and 324 in FIGS. 11 and 12, secured thereto by bolts 325. The chuck 10f is mounted on a spindle, like the one on which the chuck 10 is mounted, and a bolt 102f is used for connecting the hub 92f to a drawbar. The ball joints 40f are mounted in the cover plate and the cover plate 322 has the openings 326 for the ball joints 40f located on a larger diameter than the openings 328 in the cover plate 324. When the cover plate 322 is used, each of the rocker arms 310 is positioned so that the inner end portion 312 thereof extends inwardly of the housing 318 toward the spindle hub 92f when the outer end portion of the rocker arm 310 is substantially parallel to the chuck axis 103f. When the cover plate 324 is used, the rocker arms 310 are rotated, relative to the axis of the joints 40f therefor, one hundred and eighty degrees so that the inner end portion 312 of each arm 310 extends inwardly of the housing 318 in a direction away from the hub 92f when the outer end portion 314 is substantially parallel to the chuck axis 103f. As a result, the chuck 10f is adapted for larger workpieces when the cover plate 322 is used and for smaller workpieces when the cover plate 324 is used.

It will be understood that the specific construction of the improved chucks which are herein disclosed and described is presented for purposes of explanation and illustration and is not intended to indicate limits of the invention, the scope of which is defined by the following claims.

What is claimed is:

1. In a chuck, a hollow housing, a plurality of rocker arms, a ball and socket joint for each of said rocker arms pivotally mounting said rocker arm intermediate the ends thereof on said housing so that the inner end of the arm is enclosed within said housing, jaw members mounted on the outer ends of said rocker arms in a concentric relation with the chuck axis, and means disposed within said housing and engaged with said rocker arms adjacent the inner ends thereof for concurrently pivoting said rocker arms relative to said housing so that said jaws are moved radially of said axis.

2. In a chuck, a hollow body having an open side, a cover plate mounted on said side and having a plurality of openings therein, a plurality of rocker arms extending through said openings, a plurality of ball and socket joints mounted in said openings and pivotally supporting said rocker arms intermediate said ends thereof on said cover plate, seal means on said cover plate extending about said openings and engaged with said rocker arms on the outer side of said cover plate, fluid lubricant in said body in contact with said rocker arms, jaw members mounted on the outer ends of said rocker arms in a concentric relation with said chuck axis, and means disposed within said body and engaged with said rocker arms adjacent the inner ends thereof for concurrently pivoting said rocker arms relative to said body so that said jaws are moved radially of said axis.

3. In a chuck, a hollow housing, a plurality of rocker arms, a ball and socket joint for each of said rocker arms pivotally mounting said rocker arm intermediate the ends thereof on said housing so that the inner end of the arm is enclosed within said housing, jaw members mounted on the outer ends of said rocker arms in a concentric relation with the chuck axis, and means disposed within said housing and engaged with said rocker arms adjacent the inner ends thereof for concurrently pivoting said rocker arms relative to said housing so that said jaws are moved in a path at least a portion of which extends radially of said axis and inwardly toward the plane of said ball joints.

4. In a chuck, a hollow body having an open side, a cover plate mounted on said side and having a plurality of openings therein, stop means mounted on the outer side of said cover plate, a plurality of rocker arms extending through said openings, a plurality of ball and socket joints mounted in said openings and pivotally supporting said rocker arms intermediate said ends thereof on said cover plate, seal means on said cover plate extending about said openings and engaged with said rocker arms on the outer side of said cover plate, fluid lubricant in said body in contact with said rocker arms, jaw members mounted on the outer ends of said rocker arms in a concentric relation with said chuck axis, and means disposed within said body and engaged with said rocker arms adjacent the inner ends thereof for concurrently pivoting said rocker arms relative to said body so that said jaws are moved on a path a portion of which extends radially of said axis and toward said cover plate so that a workpiece clamped between said jaws is movable against said end stops.

5. In a chuck, a hollow housing, a plurality of rocker arms pivotally mounted intermediate their ends on said housing so that the inner ends of the arms are enclosed within the housing, jaw members mounted on the outer ends of the rocker arms in a concentric relation with the chuck axis, and means disposed within said body and engaged with said rocker arms adjacent the inner ends thereof for concurrently pivoting said rocker arms relative to said housing so that said jaws are moved radially of said axis, said means comprising a reciprocatable member in said housing, a plurality of lever members pivotally connected at their inner ends to said reciprocatable member, and coacting meshing teeth formed on the outer ends of said lever members and the inner ends of said rocker arms.

6. In a chuck, a hollow housing, a plurality of rocker arms pivotally mounted intermediate their ends on said housing so that the inner ends of the arms are enclosed within the housing, jaw members mounted on the outer ends of the rocker arms in a concentric relation with the chuck axis, and means disposed within said body and engaged with said rocker arms adjacent the inner ends thereof for concurrently pivoting said rocker arms relative to said housing so that said jaws are moved radially of said axis, said means comprising a reciprocatable member in said housing, a plurality of toggle levers pivotally connected at their inner ends to said reciprocatable member and adjacent their outer ends to the inner ends of said rocker arms, and coacting cam means on said housing and the outer ends of said arms providing for inward movement of said arms on movement of said toggle levers in a direction to rock said jaw members in one direction.

7. In a chuck, a hollow housing, a plurality of rocker arms, a ball and socket joint for each of said rocker arms pivotally mounting said rocker arm intermediate the ends thereof on said housing so that the inner end of the arm is enclosed within said housing, jaw members mounted on the outer ends of said rocker arms in a concentric relation with the chuck axis, and means disposed within said housing and engaged with said rocker arms adjacent the inner ends thereof for concurrently pivoting said rocker arms relative to said housing so that said jaws are moved radially of said axis, said means comprising piston means engaged with the inner ends of said rocker arms, spring means in said housing urging said piston means in one direction to pivot said jaws about the ball joints therefor, and conduit means communicating with said housing for supplying fluid thereto for moving said piston means in an opposite direction.

8. In a chuck, a hollow body having an open side, a cover plate mounted on said side and having a plurality of openings therein, a plurality of rocker arms extending through said openings, each of said rocker arms having angularly related inner and outer end portions, a plurality of ball and socket joints mounted in said openings and pivotally supporting said rocker arms intermediate said ends thereof on said cover plate so that the outer end portions of said arms are substantially parallel to the axis of said chuck, seal means on said cover plate extending about said openings and engaged with said rocker arms on the outer side of said cover plate, fluid lubricant in said body in contact with said rocker arms, jaw members mounted on the outer ends of said rocker arms in a concentric relation with said chuck axis, and toggle lever means disposed within said body and pivotally connected to said rocker arms adjacent the inner ends thereof for concurrently pivoting said rocker arms relative to said body so that said jaws are moved radially of said axis.

9. In a chuck, a hollow housing, a plurality of rocker arms pivotally mounted intermediate their ends on said housing so that the inner ends of the arms are enclosed in the housing, jaw members mounted on the outer ends of said rocker arms in a concentric relation with the chuck axis, reciprocating means mounted on said housing, toggle lever means connected to said reciprocating means and engaged with said rocker arms adjacent the inner ends thereof for concurrently pivoting said rocker arms so that said jaws are moved radially of said axis in response to reciprocation of said reciprocating means, each of said rocker arms having a flexible section intermediate the ends thereof whereby said toggle lever means is movable to an over-center position to lock said chuck jaws in one position.

10. In a chuck,
   a rotatable support,
   a plurality of rocker arms,
   ball and socket joints for said rocker arms
      a pivotally mounting the latter intermediate the ends thereof on and concentrically about the axis of said support,
   jaw members
      mounted on the forward ends of said rocker arms,
   an actuator
      mounted for reciprocation parallel to the axis of said support and equidistantly from the rearward ends of said rocker arms, and
   toggle levers
      pivotally connected to said actuator and to the rearward ends of said rocker arms,
      said levers being operable by reciprocatory movement of said actuator to rock said arms on said ball and socket joints relative to said support so that said jaws are moved radially of said axis.

11. The combination as set forth in claim 10 wherein said support is in the form of a hollow, sealed and fluid-tight housing, and wherein the portions of said rocker arms extending rearwardly of said ball and socket joints, said toggle levers and at least a portion of said actuator are contained within said housing, and including lubricant liquid in said housing, said liquid adapted to be thrown outwardly in the housing by centrifugal force during rotation of said chuck and operable during said operation to lubricate said ball and socket joints said actuator and the pivot connections between said toggle levers and said rocker arms and between said toggle levers and said actuator.

References Cited in the file of this patent

UNITED STATES PATENTS

| | | |
|---|---|---|
| 2,613,943 | Trudeau | Oct. 14, 1952 |
| 2,712,499 | Grobey | July 5, 1955 |
| 2,778,652 | Ingwer | Jan. 22, 1957 |
| 2,815,959 | Vandenbery | Dec. 10, 1957 |
| 2,865,643 | Parker | Dec. 23, 1958 |